US010088187B2

(12) United States Patent
He et al.

(10) Patent No.: US 10,088,187 B2
(45) Date of Patent: Oct. 2, 2018

(54) MONITORING SYSTEM FOR AIR CONDITIONING SYSTEMS BASED ON DISTRIBUTED POWER GENERATION AND AIR CONDITIONING SYSTEM USING SAME

(71) Applicant: GREE ELECTRIC APPLIANCES, INC. OF ZHUHAI, Guangdong (CN)

(72) Inventors: Yuxue He, Guangdong (CN); Zhigang Zhao, Guangdong (CN); Haichuan Song, Guangdong (CN); Chenglin Lin, Guangdong (CN); Chunmiao Jiang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 161 days.

(21) Appl. No.: 15/101,333

(22) PCT Filed: Sep. 12, 2014

(86) PCT No.: PCT/CN2014/086381
§ 371 (c)(1),
(2) Date: Jun. 2, 2016

(87) PCT Pub. No.: WO2015/081743
PCT Pub. Date: Jun. 11, 2015

(65) Prior Publication Data
US 2016/0282004 A1 Sep. 29, 2016

(30) Foreign Application Priority Data

Dec. 6, 2013 (CN) .......................... 2013 1 0656840

(51) Int. Cl.
*F24F 11/00* (2018.01)
*G05B 15/02* (2006.01)
(Continued)

(52) U.S. Cl.
CPC ............ *F24F 11/006* (2013.01); *F24F 11/30* (2018.01); *F24F 11/62* (2018.01); *G05B 15/02* (2013.01);
(Continued)

(58) Field of Classification Search
None
See application file for complete search history.

(56) References Cited

U.S. PATENT DOCUMENTS 8,838,282 B1 * 9/2014 Ratliff ................. H02J 13/0013
700/19
2004/0138786 A1 7/2004 Blackett et al.
(Continued)

FOREIGN PATENT DOCUMENTS

CN 201174613 Y 12/2008
CN 101674032 A 3/2010
(Continued)

OTHER PUBLICATIONS

International Search Report and Written Opinion (in Chinese language) issued by the State Intellectual Property Office of the P.R. China, dated Nov. 24, 2014, for International Application No. PCT/CN2014/086381; 9 pages.
(Continued)

*Primary Examiner* — Paul Yanchus, III
(74) *Attorney, Agent, or Firm* — Faegre Baker Daniels LLP (57) ABSTRACT

A monitoring system for air conditioning systems based on distributed power generation and an air conditioning system using same. The monitoring system for air conditioning systems comprises a distributed power generation monitoring subsystem, a heating and ventilation energy management subsystem and a main monitoring system. The distributed power generation monitoring subsystem and the
(Continued)

heating and ventilation energy management subsystem respectively monitor power generation status information of a distributed power generation device in an air conditioning system based on distributed power generation and power consumption status information of inherent devices in the system. The main monitoring system acquires monitoring data of the two subsystems by using a uniform first transmission protocol. In addition, the main monitoring system controls the distributed power generation device and the inherent devices in the air conditioning system according to the power generation status information and the power consumption status information.

11 Claims, 2 Drawing Sheets

(51) Int. Cl.
    *H02S 10/10*      (2014.01)
    *H04L 12/28*      (2006.01)
    *F24F 11/30*      (2018.01)
    *F24F 11/62*      (2018.01)
    *F24F 11/46*      (2018.01)
    *F24F 11/47*      (2018.01)

(52) U.S. Cl.
    CPC .......... *H02S 10/10* (2014.12); *H04L 12/2816* (2013.01); *F24F 11/46* (2018.01); *F24F 11/47* (2018.01); *G05B 2219/2638* (2013.01); *G05B 2219/2642* (2013.01); *Y02B 70/3241* (2013.01); *Y04S 20/227* (2013.01)

(56) References Cited

U.S. PATENT DOCUMENTS

| | | |
|---|---|---|
| 2006/0276938 A1 | 12/2006 | Miller |
| 2010/0076615 A1* | 3/2010 | Daniel ............... F03D 9/00 700/293 |
| 2010/0146087 A1 | 6/2010 | Kumar et al. |
| 2012/0101639 A1* | 4/2012 | Carralero ............ G06F 1/26 700/286 |
| 2012/0212050 A1 | 8/2012 | Takehara |
| 2012/0326511 A1 | 12/2012 | Johnson |

FOREIGN PATENT DOCUMENTS

| | | |
|---|---|---|
| CN | 101738975 A | 6/2010 |
| CN | 201567809 U | 9/2010 |
| CN | 201673399 U | 12/2010 |
| CN | 102005975 A | 4/2011 |
| CN | 102509175 U | 6/2012 |
| CN | 102640385 A | 8/2012 |
| CN | 202443306 U | 9/2012 |
| CN | 102868173 A | 1/2013 |
| CN | 103001225 A | 3/2013 |
| CN | 103388870 A | 11/2013 |
| EP | 0748991 A2 | 12/1996 |
| EP | 1635286 A1 | 3/2006 |
| EP | 2868991 A1 | 5/2015 |
| JP | H 10267353 A | 10/1998 |
| JP | 2006331372 A | 12/2006 |
| JP | 2013195000 A | 9/2013 |
| KR | 10-20130110981 A | 10/2013 |
| WO | WO2008/025357 A1 | 3/2008 |
| WO | WO2012/048012 A2 | 4/2012 |

OTHER PUBLICATIONS

English translation of the International Search Report issued by the State Intellectual Property Office of the P.R. China, dated Nov. 24, 2014, for International Application No. PCT/CN2014/086381; 4 pages.
Japanese Office Action issued by the Japanese Patent Office regarding Japanese Patent Application No. 2016-536835, dated Sep. 6, 2017, 12 pages.
Chinese Office Action regarding Chinese Patent Application No. 201310656840.9, State Intellectual Property Office of the People's Republic of China, dated Dec. 1, 2016, 9 pages.
Supplementary European Search Report regarding European Application No. 14868139, European Patent Office, dated Apr. 3, 2017, 9 pages.
R. C. Sonderegger, *Distributed Generation Architecture and Control*, E-Vision Conference Proceedings, Jan. 1, 2000, 10 pages.
Communication Pursuant to Article 94(3) EPC and Examination, European Patent Office, European Patent Application No. 14868139. 8-1205 to Gree Electric Appliances, Inc. of Zhuhai, May 25, 2018, 7 pages.
"Sharma, Venkatesh Kumar, et al., "A Hybrid System for Power Refrigerate & Air Conditioning System by Renewable "Source of Energy," International Journal of Advanced Electrical and Electronics Engineering (IJAEEE), vol. 1, Issue 2, 2012, 4 pages.

\* cited by examiner

MONITORING SYSTEM FOR AIR CONDITIONING SYSTEMS BASED ON DISTRIBUTED POWER GENERATION AND AIR CONDITIONING SYSTEM USING SAME

CROSS REFERENCE OF RELATED APPLICATION

This application is the US national phase of International Application No. PCT/CN2014/086381 filed on Sep. 12, 2014 which claims the priority to Chinese Patent Application No. 201310656840.9, titled "AIR-CONDITIONING MONITORING SYSTEM BASED ON DISTRIBUTED POWER GENERATION AND AIR CONDITIONING SYSTEM USING SAME", filed on Dec. 6, 2013 with the State Intellectual Property Office of the People's Republic of China, the disclosures of which is incorporated herein by reference in their entireties.

FIELD

The present disclosure relates to the technical field of air conditioner control, and in particular to an air conditioning system monitoring system based on distributed power generation, and an air conditioning system using the air conditioning system monitoring system.

BACKGROUND

An air conditioning system based on distributed power generation refers to a frequency conversion air conditioning system equipped with distributed power generation devices. Distributed power generation includes the photovoltaic power generation, the wind power generation, the wind-solar hybrid power generation, the biomass power generation, and the like. Power generated by the distributed power generation devices is supplied to the air conditioning system, which may partly or completely substitute for power from the mains supply, thereby reducing the load of the mains supply. Furthermore, natural and clean energy is used by the power generation devices, thereby reducing the operation costs of the air conditioning system. Therefore, the air conditioning system based on distributed power generation has a promising application perspective.

Different from a normal air conditioning system, the air conditioning system based on distributed power generation is equipped with distributed power generation devices. In the conventional technology, the power generation situation of the distributed power generation devices is monitored separately from the power consumption situation of inherent devices in the air conditioning system, such as a system host. Therefore, it is impossible to properly distribute power according to the operation situation of the air conditioning system, which is unfavorable for coordinating and controlling the whole air conditioning system.

SUMMARY

In view of the above, the object of the present disclosure is to provide an air conditioning system monitoring system based on distributed power generation, and a system using the air conditioning system monitoring system, in order to solve the problem of poor capability of coordinating and controlling the whole system due to the separate monitoring of the distributed power generation devices and other inherent devices in the existing air conditioning system based on distributed power generation.

To achieve the above object, a technical solution is provided as follows.

An air conditioning system monitoring system based on distributed power generation is provided, which is applied to an air conditioning system based on distributed power generation, where the air conditioning system includes distributed power generation devices and inherent devices in the air conditioning system, the inherent devices in the air conditioning system is powered by the distributed power generation devices or by the distributed power generation devices and the mains supply; and the air conditioning system monitoring system includes:

a distributed power generation monitoring subsystem, configured to monitor power generation status information of the distributed power generation devices;

a heating and ventilating energy management subsystem, configured to monitor power consumption status information of the inherent devices in the air conditioning system;

a main monitoring system, configured to obtain the power generation status information and the power consumption status information, and comprehensively monitor and control the air conditioning system based on the power generation status information and the power consumption status information, where the distributed power generation monitoring subsystem and the heating and ventilating energy management subsystem are configured to exchange data with the main monitoring system by using a first transmission protocol respectively.

Preferably, the first transmission protocol includes the BACnet/IP protocol.

Preferably, the distributed power generation devices are photovoltaic power generation devices.

Preferably, the main monitoring system includes:

a first main control subunit, configured to obtain and store the power generation status information, and send the power consumption status information to the distributed power generation monitoring subsystem;

a second main control subunit, configured to obtain and store the power consumption status information, and send the power generation status information to the heating and ventilating energy management subsystem; and a third main control subunit, configured to generate a main control instruction based on the power generation status information and/or the power consumption status information, where the main control instruction includes at least one of a first main control instruction to control power generation status of the distributed power generation devices and a second main control instruction to control power consumption status of the inherent devices in the air conditioning system.

Preferably, the air conditioning system monitoring system based on distributed power generation further includes: a remote control terminal, configured to exchange data with the main monitoring system by using the TCP/IP protocol; and/or a system host human-machine interface, configured to exchange data with the main monitoring system by using the RS485 protocol, the BACnet protocol, the Modbus protocol or the CAN protocol.

Preferably, the distributed power generation devices include a combiner box configured to converge and output direct current generated by photovoltaic modules, and an inverter configured to supply power to an alternating current load;

the power generation status information includes information on current outputted by the combiner box which represents a magnitude of power generated by the distributed power generation devices and information on current outputted by the inverter which represents a magnitude of power supplied by the distributed power generation devices; and the distributed power generation monitoring subsystem includes: a data collector configured to obtain the information on the current outputted by the combiner box and the information on the current outputted by the inverter, and exchange data with the main monitoring system by using the first transmission protocol.

Preferably, the distributed power generation monitoring subsystem further includes a power generation monitoring human-machine interface connected to the data collector and configured to display a collection result of the data collector.

Preferably, the inherent devices in the air conditioning system include at least one of a system host, a refrigerating water pump, a cooling water pump and a cooling tower; and the heating and ventilating energy management subsystem includes:

a main controller, configured to exchange data with the main monitoring system by using the first transmission protocol; and electric meters, configured to detect the inherent devices in the air conditioning system in a one-to-one correspondence to obtain the power consumption status information, and output the power consumption status information to the main controller.

Preferably, the heating and ventilating energy management subsystem further includes:

a field controller, configured to obtain the second control instruction by means of the main controller, and perform a linkage control on the inherent devices in the air conditioning system in response to the second control instruction.

Preferably, the heating and ventilating energy management subsystem further includes:

a regional controller, configured to generate an air parameter control instruction in response to a user operation instruction, and exchange data with the main controller; and an end controller, configured to control an indoor air parameter in response to the air parameter control instruction, where the end controller includes at least one of a temperature controller, a fresh air controller and a return air controller.

An air conditioning system based on distributed power generation, includes distributed power generation devices and inherent devices in the air conditioning system, where the inherent devices in the air conditioning system is powered by the distributed power generation devices or by the distributed power generation devices and the mains supply; and the air conditioning system further includes the described air conditioning system monitoring system.

Preferably, the inherent devices in the air conditioning system include a centrifugal water chiller and/or a screw water chiller.

As can be seen from the above technical solution, according to the present disclosure, not only the power generation status information of the distributed power generation devices and the power consumption status information of the inherent devices in the air conditioning system are monitored by the distributed power generation monitoring subsystem and the heating and ventilating energy management subsystem respectively, but also the above monitored data are obtained by the main monitoring system using the uniform first transmission protocol, which achieves seamless collaboration and data sharing between the two subsystems and improves the capability of coordinating and controlling the distributed power generation devices and the inherent devices in the air conditioning system, and solves the problem in the conventional technology.

BRIEF DESCRIPTION OF THE DRAWINGS

The accompanying drawings needed to be used in the description of the embodiments or the conventional technology are described briefly as follows, so that the technical solutions according to the embodiments of the present disclosure or according to the conventional technology become clearer. It is apparent that the accompanying drawings in the following description are only some embodiments of the present disclosure. For those skilled in the art, other accompanying drawings may be obtained according to these accompanying drawings without any creative work.

DETAILED DESCRIPTION OF EMBODIMENTS

The technical solution according to the embodiments of the present disclosure is described clearly and completely as follows in conjunction with the accompanying drawings in the embodiments of the present disclosure. It is apparent that the described embodiments are only a part of the embodiments according to the present disclosure. All the other embodiments obtained by those skilled in the art based on the embodiments in the present disclosure without any creative work fall into the scope of the present disclosure.

An air conditioning system monitoring system based on distributed power generation is disclosed according to an embodiment of the present disclosure, in order to solve the problem of poor capability of coordinating and controlling the whole system due to the separately monitoring of photovoltaic power generation and power consumption of devices in the existing air conditioning system based on distributed power generation.

Figure 1:
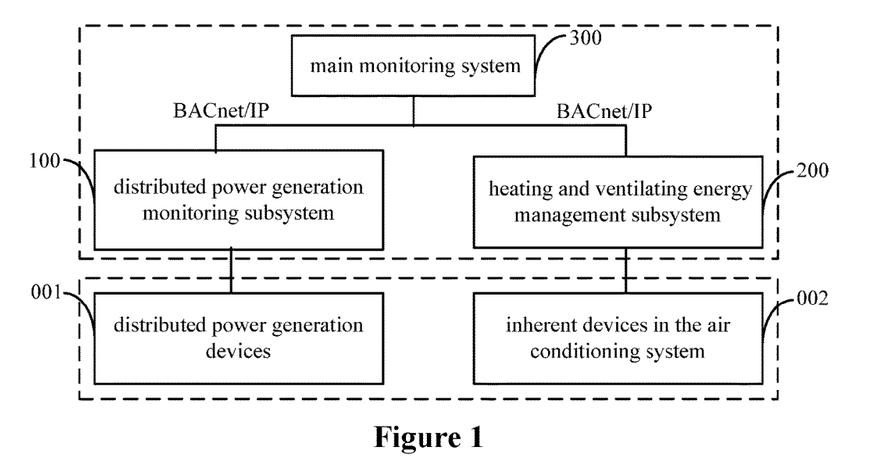
FIG. 1 is a structural schematic diagram of an air conditioning system monitoring system based on distributed power generation according to a first embodiment of the present disclosure.

An air conditioning system monitoring system based on distributed power generation is provided according to a first embodiment of the present disclosure. An air conditioning system based on distributed power generation includes distributed power generation devices 001 and inherent devices 002 in the air conditioning system. In a case that the distributed power generation devices 001 generate sufficient power, for example, in a case that power outputted by the distributed power generation devices 001 is larger than or equal to operation power of the inherent devices 002 in the air conditioning system, the inherent devices 002 in the air conditioning system may be powered completely by the distributed power generation devices 001. In a case that the distributed power generation devices 001 generate less power, for example, in a case that power outputted by the distributed power generation devices 001 is less than the operation power of the inherent devices 002 in the air conditioning system, the inherent devices 002 in the air conditioning system may be powered by the distributed power generation devices 001 and the mains supply jointly, or may be powered by the mains supply only.

Referring to FIG. 1, the air conditioning system monitoring system based on distributed power generation includes a distributed power generation monitoring subsystem 100, a heating and ventilating energy management subsystem 200 and a main monitoring system 300.

The distributed power generation monitoring subsystem 100 is configured to monitor power generation status information of the distributed power generation devices 001. The heating and ventilating energy management subsystem 200 is configured to monitor power consumption status information of the inherent devices 002 in the air conditioning system. The main monitoring system 300 is configured to obtain the power generation status information and the power consumption status information, and comprehensively monitor and control the air conditioning system based on the power generation status information and the power consumption status information. The distributed power generation monitoring subsystem 100 and the heating and ventilating energy management subsystem 200 are configured to exchange data with the main monitoring system 300 by using a first transmission protocol respectively.

As can be seen from the above structures and functions of the embodiment, in the air conditioning system based on distributed power generation, not only the power generation status information of the distributed power generation devices and the power consumption status information of the inherent devices in the air conditioning system are monitored by the distributed power generation monitoring subsystem and the heating and ventilating energy management subsystem respectively, but also the above monitored data of the two subsystems are obtained by the main monitoring system using the uniform first transmission protocol, which achieves seamless collaboration and data sharing between the two subsystems. In this way, in monitoring the distributed power generation devices by the distributed power generation monitoring subsystem, not only operation status (i.e., the power generation status information) of the distributed power generation devices is referred to, but also the operation status (i.e., the power consumption status information) of the inherent devices in the air conditioning system can be referred to, so as to adjust power generated by the distributed power generation devices and proportion of power outputted to the individual inherent devices in the air conditioning system according to a real-time power requirement of the inherent devices in the air conditioning system. Accordingly, in monitoring the inherent devices in the air conditioning system by the heating and ventilating energy management subsystem, not only the power consumption status information is referred to, but also the power generation status information can be referred to, so as to adjust the operation status of relevant inherent devices in the air conditioning system according to the real-time power generation of the distributed power generation devices, distribute power outputted by the distributed power generation devices properly, and reduce unnecessary loss of power. It follows that the capability of coordinating and controlling the distributed power generation devices and the inherent devices in the air conditioning system is improved, the power distribution is optimized, the performance of the air conditioning system is improved and the problem in the conventional technology is solved according to the embodiment.

Specifically, according to the embodiment of the present disclosure, the first transmission protocol includes the BACnet/IP protocol which is a standard in the heating, ventilating and air conditioning industry. The inherent devices in the air conditioning system include at least one of a system host, a refrigerating water pump, a cooling water pump and a cooling tower.

Specifically, the system host is a chiller, more specifically, a water chiller, and even more specifically, a centrifugal water chiller and/or a screw water chiller.

Figure 2:
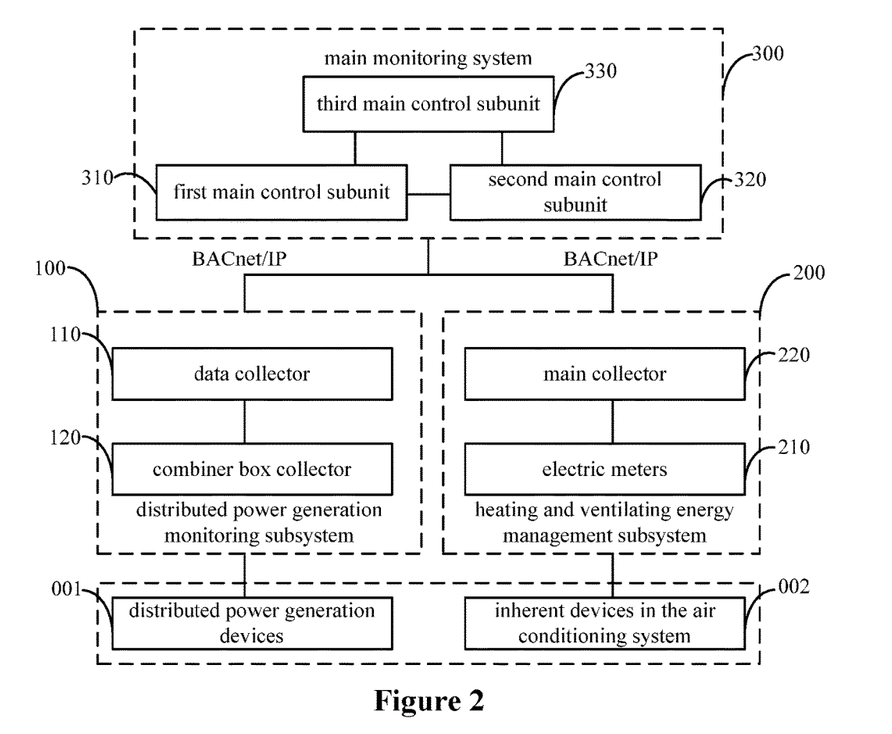
FIG. 2 is a structural schematic diagram of an air conditioning system monitoring system based on distributed power generation according to a second embodiment of the present disclosure.

Another air conditioning system monitoring system based on distributed power generation is provided according to a second embodiment of the present disclosure. An air conditioning system based on distributed power generation includes distributed power generation devices 001 and inherent devices 002 in the air conditioning system. In a case that the distributed power generation devices 001 generate sufficient power, the inherent devices 002 in the air conditioning system may be powered completely by the distributed power generation devices 001. In a case that the distributed power generation devices 001 generate less power, the inherent devices 002 in the air conditioning system may be powered by the distributed power generation devices 001 and the mains supply jointly.

Referring to FIG. 2, the air conditioning system monitoring system based on distributed power generation includes a distributed power generation monitoring subsystem 100, a heating and ventilating energy management subsystem 200 and a main monitoring system 300.

Preferably, the main monitoring system 300 includes a first main control subunit 310, a second main control subunit 320, and a third main control subunit 330.

The first main control subunit 310 is configured to exchange data with the distributed power generation monitoring subsystem 100 by using the first transmission protocol. The second main control subunit 320 is configured to exchange data with the heating and ventilation energy management subsystem 200 by using the first transmission protocol. Furthermore, the first main control subunit 310 and the second main control subunit 320 exchange data with each other directly or by means of the third main control subunit 330.

Operation procedures of the above three subunits are described as follows.

The first main control subunit 310 obtains and stores the power generation status information of the distributed power generation devices 001 collected by the distributed power generation monitoring subsystem 100. The second main control subunit 320 obtains and stores the power consumption status information of the inherent devices 002 in the air conditioning system collected by the heating and ventilating energy management subsystem 200.

The third main control subunit 330 obtains the power generation status information and the power consumption status information by means of the first main control subunit 310 and the second main control subunit 320 respectively, generates a main control instruction based on the power generation status information and/or the power consumption status information, and sends the main control instruction to a respective subsystem (the distributed power generation monitoring subsystem 100 or the heating and ventilating energy management subsystem 200). Specifically, the main control instruction includes at least one of a first main control instruction and a second main control instruction. The first main control instruction is sent to the distributed power generation monitoring subsystem 100 to control power generation status of the distributed power generation devices, and the second main control instruction is sent to the heating and ventilating energy management subsystem 200 to control power consumption status of the inherent devices 002 in the air conditioning system.

The first main control subunit 310 obtains and sends the power consumption status information stored by the second main control subunit 320 to the distributed power generation monitoring subsystem 100. The second main control subunit 320 obtains and sends the power consumption status information stored by the first main control subunit 310 to the heating and ventilating energy management subsystem 200. Therefore, the seamless collaboration and data sharing between the distributed power generation monitoring subsystem 100 and the heating and ventilating energy management subsystem 200 are achieved.

Preferably, the distributed power generation devices includes photovoltaic modules configured to convert solar energy into electric energy, a combiner box configured to converge and output direct current generated by the photovoltaic modules, and an inverter configured to supply power to an alternating current load. Accordingly, the distributed power generation monitoring subsystem 100 includes a data collector 110 configured to collect the power generation status information of the distributed power generation devices 001, and send the power generation status information to the first main control subunit 310 by using the BACnet/IP protocol. Specifically, a combiner box collector 120 connected to the combiner box collects information on current outputted by the combiner box which represents the magnitude of power generated by the distributed power generation devices and information on current outputted by the inverter which represents the magnitude of power supplied by the distributed power generation devices. Specifically, information on current outputted by the combiner box is collected by the combiner box collector 120, which exchanges data with the data collector 110 through a field bus.

Preferably, the heating and ventilating energy management subsystem 200 includes electric meters 210 and a main controller 220.

Multiple electric meters 210 correspond to the inherent devices 002 (include a system host, a refrigerating water pump, a cooling water pump and a cooling tower and the like) of the air conditioning devices respectively, and are configured to detect the power consumption statues information of the inherent devices 002 of the air conditioning.

The main controller 220 exchanges data with the main monitoring system 300 by using the BACnet/IP protocol, specifically, including: acquiring a detection result from the electric meters 210, and sending the detection result to the second main control subunit 320. One or more such main controller 220 may be provided according to an actual application.

As can be seen from the above structures and functions of the embodiment, the power generation status information of the distributed power generation devices is collected and uploaded to the main monitoring system by the data collector in the distributed power generation monitoring subsystem, and the power consumption status information of the inherent devices in the air conditioning system is collected by the electric meters and uploaded by the main controller to the main monitoring system. Then the main monitoring system, via a sending unit, sends the power generation status information collected by the distributed power generation monitoring subsystem to the heating and ventilating energy management subsystem, and sends the power consumption status information collected by the heating and ventilating energy management subsystem to the distributed power generation monitoring subsystem, thereby achieving seamless collaboration and data sharing between the distributed power generation monitoring subsystem and the heating and ventilating energy management subsystem, improving the capability of coordinating and controlling the distributed power generation devices and the inherent devices in the air conditioning system, and solving the problem in the conventional technology. Furthermore, since multiple inherent devices in the air conditioning system are detected in a one-to-one correspondence by multiple electric meters arranged in the heating and ventilating energy management subsystem, the main controller can obtain an optimal control strategy by comprehensively analyzing the power consumption status information of all of the devices or relevant devices, thereby maximizing power saved in the air conditioning system.

In the embodiment of the present disclosure, the distributed power generation monitoring subsystem further includes an electric energy quality regulator, a converter, and the like, which are configured to adjust the power generated by the distributed power generation devices and proportion of power outputted to the individual inherent devices in the air conditioning system, in response to the first control instruction generated by the main monitoring system.

Furthermore, the main controller exchanges data with the electric meters by using the Modbus RTU protocol. Moreover, the main controller may further send a relevant control instruction to a device of the air conditioning system, such as a dehumidifier and a chiller, by using the Modbus RTU protocol.

Furthermore, in the heating and ventilating energy management subsystem, each main controller is further configured with one or more field controllers. The field controllers are configured to obtain the second control instruction generated by the main monitoring system by means of the common main controller, and perform a linkage control on the inherent devices in the air conditioning system in response to the second control instruction, thereby achieving coordinating operation among the inherent devices in the air conditioning system.

Figure 3:
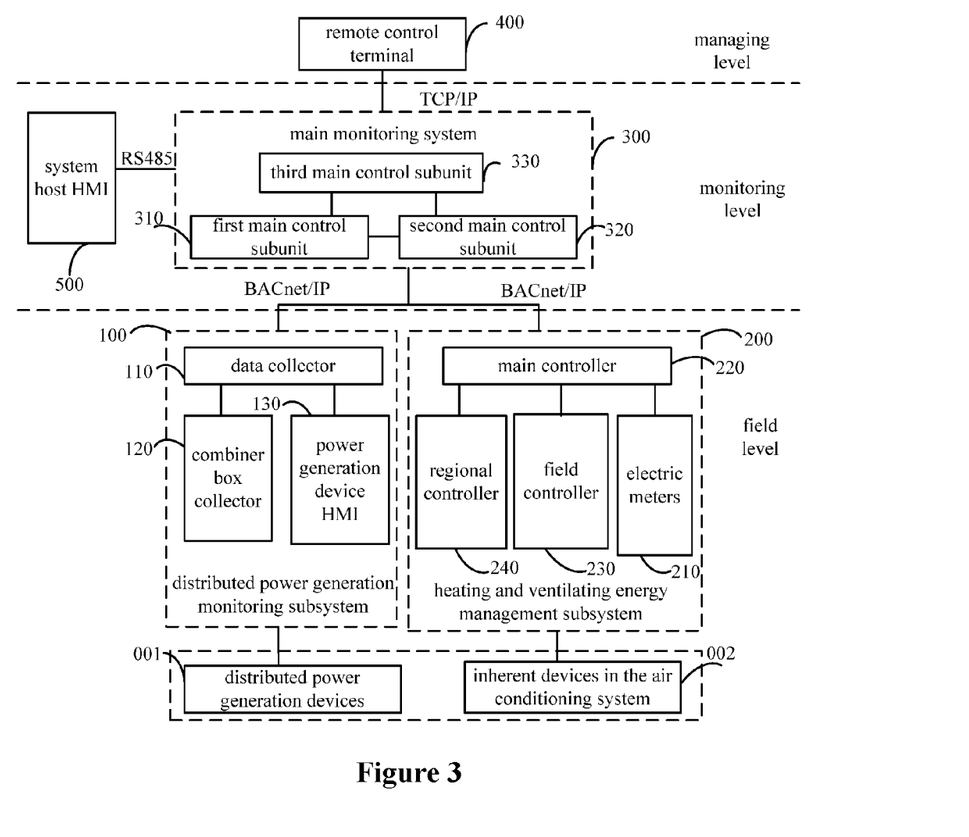
FIG. 3 is a structural schematic diagram of an air conditioning system monitoring system based on distributed power generation according to a third embodiment of the present disclosure.

Referring to FIG. 3, an air conditioning system monitoring system based on distributed power generation according to a third embodiment of the present disclosure includes a distributed power generation monitoring subsystem 100, a heating and ventilating energy management subsystem 200, a main monitoring system 300 and a remote control terminal 400.

A three-level control is achieved based on the multi-agent technology according to the embodiment. The so-called "three-level" refers to a field level constituted by the distributed power generation monitoring subsystem 100 and the heating and ventilating energy management subsystem 200, a monitoring level constituted by the main monitoring system 300, and a managing level constituted by the remote control terminal 400. The BACnet/IP protocol is used for data exchanging between the fielding level and the monitoring level, and the TCP/IP protocol is used for data exchanging between the monitoring level and the managing level.

The main monitoring system 300 includes a first main control subunit 310, a second main control subunit 320 and a third main control subunit 330.

Regarding the control of the distributed power generation devices, a distributed power generation micro-grid control network is constituted by the first main control subunit 310, the third main control subunit 330 and the distributed power generation monitoring subsystem 100. The first main control subunit 310 and the third main control subunit 330 are equivalent to an upper agent (i.e., a micro-grid monitoring center (CCU)) in the micro-grid control network, to monitor various elements in an electric grid, determine a contribution of each of the distributed power generation devices using an optimal algorithm, and then send an optimal result to a lower agent. The distributed power generation monitoring subsystem 100 serves as the lower agent which is equivalent to a local monitoring center, to perform coordination and control on the distributed power generation devices in the electric grid. The distributed power generation monitoring subsystem 100 may be controlled by the CCU while having a capability of independent operation.

Regarding the control of the inherent devices in the air conditioning system, a distributed control system is constituted by the second main control subunit 320, the third main control subunit 330 and the heating and ventilating energy management subsystem 200. The second main control subunit 320 and the third main control subunit 330 are equivalent to an upper level (which may specifically be a data managing server, such as a building automation system (BAS), a platform for managing history records and configuration data, and an intuitive user interface) of the distributed control system, which communicates with a lower agent, i.e., the heating and ventilating energy management subsystem 200 through a BACnet/IP network, thereby not only achieving an unmanned automatic operation of the air conditioning system, but also achieving functions of graphic management, data presentation, alarm and event management, and the like.

It should be noted that, in order to facilitate field monitoring, the distributed power generation monitoring subsystem 100 includes a power generation device human-machine interface 130 in addition to the devices described above, such as the data collector 110 and the combiner box collector 120. The power generation device human-machine interface is connected to the data collector 110 and is configured to display a collection result of the data collector 110 and provide a graphic manual management operation interface for the distributed power generation devices to facilitate the manual control of the distributed power generation devices when necessary.

The heating and ventilating energy management subsystem 200 includes electric meters 210, a main controller 220 and a field controller 230, which have functions as described in the above embodiments. Moreover, the heating and ventilating energy management subsystem 200 further includes a regional controller 240 for manually adjusting and controlling an air parameter in each control region of the air conditioning system. Specifically, the regional controller 240 is configured to generate an air parameter control instruction in response to a user operation instruction, and send the air parameter control instruction to a respective end controller, such as a temperature controller, a fresh air controller, a return air controller, to achieve the manual regulation of a parameter such as air temperature of a respective region. Furthermore, the regional controller 240 exchanges data with the main controller by means of respective communication module to upload information such as the user operation instruction and the air parameter control instruction to the main controller, and then the information is uploaded to the monitoring level and the managing level, achieving synchronous three-level monitoring.

The air conditioning system monitoring system according to the embodiment further includes a system host human-machine interface 500, which is in the monitoring level and exchanges data with the main monitoring system 300 by using the RS485 protocol, the BACnet protocol, the Modbus protocol or the CAN protocol, to not only display present operation status, data and the like of the air conditioning system, and but also provide a manual operation interface for manually controlling the air conditioning system when necessary.

As can be seen from the above structures and functions of the embodiment, in the air conditioning system based on distributed power generation, not only the power generation status information of the distributed power generation devices and the power consumption status information of the inherent devices in the air conditioning system are monitored comprehensively by the distributed power generation monitoring subsystem and the heating and ventilating energy management subsystem respectively, but also the above monitored data of the two subsystems are obtained by the main monitoring system using the uniform first transmission protocol, which achieves seamless collaboration and data sharing between the two subsystems, improves the capability of coordinating and controlling the distributed power generation devices and the inherent devices in the air conditioning system, and achieves monitoring, counting and energy saving adjustment in a real-time manner for a whole process from power generation to power consumption. Furthermore, the main monitoring system is provided with various communication modules for exchanging data with human-machine interfaces of a remote client and a centrifugal machine of the air conditioning system respectively, thereby achieving the three-level monitoring of the air conditioning system and diversifying the manners for monitoring the air conditioning system.

The description of the embodiments herein enables those skilled in the art to implement or use the present disclosure. Numerous modifications to the embodiments are apparent to those skilled in the art, and the general principle herein can be implemented in other embodiments without deviation from the spirit or scope of the present disclosure. Therefore, the present disclosure is not limited to the embodiments described herein, but in accordance with the widest scope consistent with the principle and novel features disclosed herein.

The invention claimed is:

1. An air conditioning system monitoring system based on distributed power generation, applied to an air conditioning system based on distributed power generation, wherein the air conditioning system comprises distributed power generation devices and inherent devices in the air conditioning system, the inherent devices in the air conditioning system is powered by the distributed power generation devices or by the distributed power generation devices and the mains supply; and the air conditioning system monitoring system comprises:

a distributed power generation monitoring subsystem, configured to monitor power generation status information of the distributed power generation devices;

a heating and ventilating energy management subsystem, configured to monitor power consumption status information of the inherent devices in the air conditioning system; and a main monitoring system, configured to obtain the power generation status information and the power consumption status information, and comprehensively monitor and control the air conditioning system based on the power generation status information and the power consumption status information, wherein the main monitoring system comprises:

a first main control subunit, configured to obtain and store the power generation status information, and send the power consumption status information to the distributed power generation monitoring subsystem;

a second main control subunit, configured to obtain and store the power consumption status information, and send the power generation status information to the heating and ventilating energy management subsystem; and a third main control subunit, configured to generate a main control instruction based on at least one of the power generation status information and the power consumption status information, wherein the main control instruction comprises at least one of a first main control instruction to control power generation status of the distributed power generation devices and a second main control instruction to control power consumption status of the inherent devices in the air conditioning system, and wherein the distributed power generation monitoring subsystem and the heating and ventilating energy management subsystem are configured to exchange data with the main monitoring system by using a first transmission protocol respectively.

2. The air conditioning system monitoring system based on distributed power generation according to claim 1, wherein the first transmission protocol comprises the BACnet/IP protocol.

3. The air conditioning system monitoring system based on distributed power generation according to claim 1, wherein the distributed power generation devices are photovoltaic power generation devices.

4. The air conditioning system monitoring system based on distributed power generation according to claim 1, further comprising:

a remote control terminal, configured to exchange data with the main monitoring system by using the TCP/IP protocol; and/or a system host human-machine interface, configured to exchange data with the main monitoring system by using the RS485 protocol, the BACnet protocol, the Modbus protocol or the CAN protocol.

5. The air conditioning system monitoring system based on distributed power generation according to claim 1, wherein the distributed power generation devices comprise a combiner box configured to converge and output direct current generated by photovoltaic modules, and an inverter configured to supply power to an alternating current load;

the power generation status information comprises information on current outputted by the combiner box which represents a magnitude of power generated by the distributed power generation devices and information on current outputted by the inverter which represents a magnitude of power supplied by the distributed power generation devices; and the distributed power generation monitoring subsystem comprises a data collector configured to obtain the information on the current outputted by the combiner box and the information on the current outputted by the inverter, and exchange data with the main monitoring system by using the first transmission protocol.

6. The air conditioning system monitoring system based on distributed power generation according to claim 5, wherein the distributed power generation monitoring subsystem further comprises a power generation monitoring human-machine interface connected to the data collector and configured to display a collection result of the data collector.

7. The air conditioning system monitoring system based on distributed power generation according to claim 1, wherein the inherent devices in the air conditioning system comprise at least one of a system host, a refrigerating water pump, a cooling water pump and a cooling tower; and the heating and ventilating energy management subsystem comprises:

a main controller, configured to exchange data with the main monitoring system by using the first transmission protocol; and electric meters, configured to detect the inherent devices in the air conditioning system in a one-to-one correspondence to obtain the power consumption status information, and output the power consumption status information to the main controller.

8. The air conditioning system monitoring system based on distributed power generation according to claim 7, wherein the heating and ventilating energy management subsystem further comprises:

a field controller, configured to obtain the second main control instruction by means of the main controller, and perform a linkage control on the inherent devices in the air conditioning system in response to the second main control instruction.

9. The air conditioning system monitoring system based on distributed power generation according to claim 7, wherein the heating and ventilating energy management subsystem further comprises:

a regional controller, configured to generate an air parameter control instruction in response to a user operation instruction, and exchange data with the main controller; and an end controller, configured to control an indoor air parameter in response to the air parameter control instruction, wherein the end controller comprises at least one of a temperature controller, a fresh air controller and a return air controller.

10. An air conditioning system based on distributed power generation, comprising distributed power generation devices and inherent devices in the air conditioning system, wherein the inherent devices in the air conditioning system is powered by the distributed power generation devices or by the distributed power generation devices and the mains supply; and the air conditioning system further comprises an air conditioning system monitoring system based on distributed power generation, wherein the air conditioning system monitoring system is applied to the air conditioning system based on distributed power generation, and the air conditioning system monitoring system comprises:

a distributed power generation monitoring subsystem, configured to monitor power generation status information of the distributed power generation devices;

a heating and ventilating energy management subsystem, configured to monitor power consumption status information of the inherent devices in the air conditioning system; and a main monitoring system, configured to obtain the power generation status information and the power consumption status information, and comprehensively monitor and control the air conditioning system based on the power generation status information and the power consumption status information, wherein the main monitoring system comprises:
- a first main control subunit, configured to obtain and store the power generation status information, and send the power consumption status information to the distributed power generation monitoring subsystem;
- a second main control subunit, configured to obtain and store the power consumption status information, and send the power generation status information to the heating and ventilating energy management subsystem; and
- a third main control subunit, configured to generate a main control instruction based on at least one of the power generation status information and the power consumption status information, wherein the main control instruction comprises at least one of a first main control instruction to control power generation status of the distributed power generation devices and a second main control instruction to control power consumption status of the inherent devices in the air conditioning system, and wherein the distributed power generation monitoring subsystem and the heating and ventilating energy management subsystem are configured to exchange data with the main monitoring system by using a first transmission protocol respectively.

11. The air conditioning system according to claim 10, wherein the inherent devices in the air conditioning system comprise a centrifugal water chiller and/or a screw water chiller.

* * * * *